Oct. 27, 1931.  G. H. BRAWNER  1,828,761
BRAKE SHIELD
Filed Nov. 25, 1929
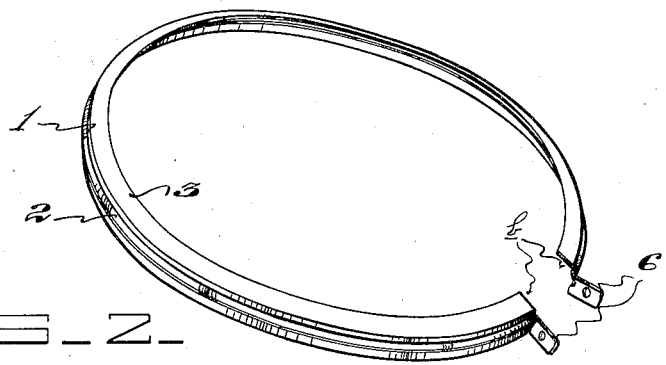
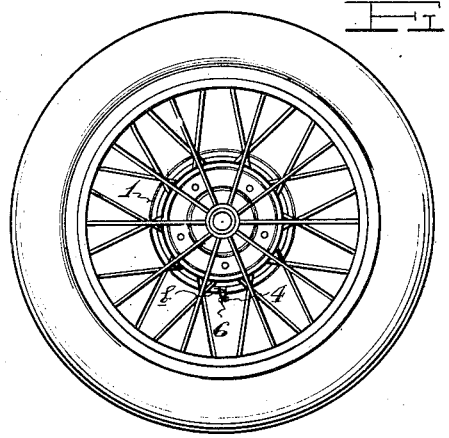
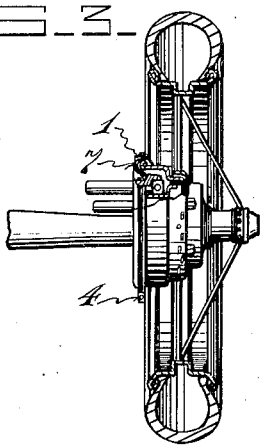
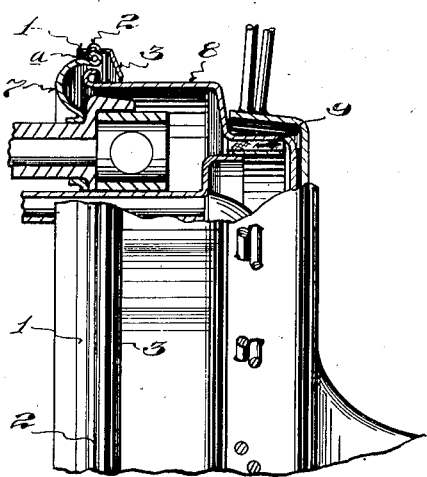
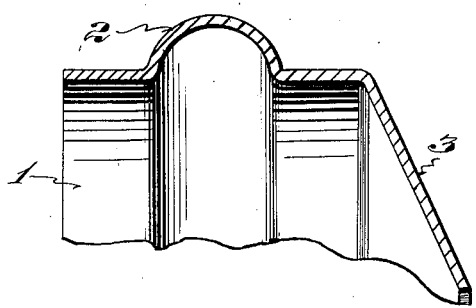
George H. Brawner
INVENTOR.
BY Ernest A. Hood
ATTORNEY.

Patented Oct. 27, 1931

1,828,761

UNITED STATES PATENT OFFICE

GEORGE H. BRAWNER, OF DALLAS, TEXAS, ASSIGNOR OF ONE-THIRD TO WILLIAM J. BRYAN AND ONE HUNDRED AND FIFTY-ONE THREE-HUNDREDTHS TO J. EARL SELLERS, BOTH OF DALLAS, TEXAS

BRAKE SHIELD

Application filed November 25, 1929. Serial No. 409,532.

This invention relates to motor vehicles and particularly to brake shields and its principal object resides in the provision of a shield for the protection of the brake linings against dirt and grit which, under ordinary circumstances, are admitted through an opening around the brake drum thereby causing excess wear upon the linings as well as impairing the efficiency of the brakes.

Another object of the invention resides in the provision of a shield especially adapted to exclude moisture from the brake drums and prevent the linings from becoming moist and slipping upon the drums to render them ineffectual as a means to stop the car.

The invention further comprehends, among its objects, the provision of a shield, as described, which adds to the appearance of the vehicle and provides an attractive finish to the wheels.

Broadly, the invention provides a device for the purpose above set forth which is both useful and ornamental and is capable of saving the operator of a motor vehicle considerable expense in replacements of brake linings as well as an assurance of dependable brakes at all times.

Having thus set forth the novel objects and salient features of the invention, a further description may be had by reference to the appended drawings wherein:—

Figure 1 is a perspective of the preferred embodiment of the invention.

Figure 2 is an elevational view of a wheel and brake drum showing the invention installed thereon.

Figure 3 is a cross sectional view of a wheel having parts of the brake housing cut away to illustrate the position of the shield.

Figure 4 is a fragmentary enlarged view of the brake housing having portions cut away to show the brake drum, lining and opening around the housing plate and illustrating the manner in which the invention is installed, and Figure 5 is a fragmentary sectional view of the invention showing the beveled flange and bead.

Ordinarily no protection is provided for brakes of the most common types and it is obvious that nothing should be allowed to prevent their proper function to insure safety in driving.

Accordingly, therefore, a band 1 having an annular bead 2 and an integral annular flange 3 constitutes the preferred structure embodying the invention. The band 1 is split at one point to enable the same to be operatively applied in the manner shown in Figures 3 and 4, and fixed in operative position by means of a suitable bolt 4 passing through and locking together the ears 6 formed upon the contiguous ends of the band 1.

The bead 2, when the band is in operative position upon the brake housing plate 7, conforms with a slightly outwardly turned edge $a$ upon the plate 7, thereby holding the same against displacement, as shown in Figure 4.

It is obvious that accumulations of foreign matter, detrimental to the operations of the brakes, will be reduced to the very minimum, due to the fact that the angular flange 3, very effectively conceals the annular opening intermediate the brake housing plate 7 and brake drum 8, normally exposed. It will be observed, especially in Figure 2, that there is provided an opening $b$ at the point of contact between the ears 6 for the purpose of allowing egress of any matter which may find its way into the brake housing or scourings from the brake lining 9. This opening also affords a means by which air may enter the housing and thereby prevent excess heating of the brake drum friction surface when the brakes are applied to excess.

It is important to note that the invention may be very easily applied by simply passing the same through the spokes of the wheel from the outside, adjusting the same in the position shown in Figure 3, and securing the same by means of the bolt 4.

Though the invention has been described with great particularity, the details of the embodiment of the invention herein shown are not to be construed as being limited thereto, as changes in arrangement and substitution of equivalents may be made by those skilled in the art without departing from the invention as defined in the appended claims.

What is claimed is:

1. A brake shield for motor vehicles comprising a band having an annular flange thereon and a bead arranged around the outer periphery of said band.

2. A brake shield formed to conform with the brake drum of a motor vehicle provided with a circumferential bead arranged to receive the edge of the housing of said drum and having a skirt portion overreaching the edge of said brake drum and means for operatively locking said shield in position.

3. A brake shield including a circular element having a circumferential bead formed therein to conformably receive the edge of the drum housing of said brake and having a skirt portion overreaching the edge of said drum and means for operatively locking said shield in position.

4. A brake shield including an interiorly flanged band having a bead formed in the outer periphery thereof to conform to the edge of the drum housing of said brake and means to lock the said band upon the said drum.

5. A brake shield comprising an interiorly flanged band having a circumferential bead formed in the outer periphery of said band to conform to the edge of the drum housing of said brake and means to operatively lock the said band to said brake drum.

In testimony whereof I affix my signature.

GEORGE H. BRAWNER.